Oct. 7, 1969

B. V. GIEGERICH 3,471,816

LOADBREAK FUSEHOLDER

Filed Feb. 1, 1968

Inventor,
Bertrand V. Giegerich,
by Francis K. Doyle
His Attorney.

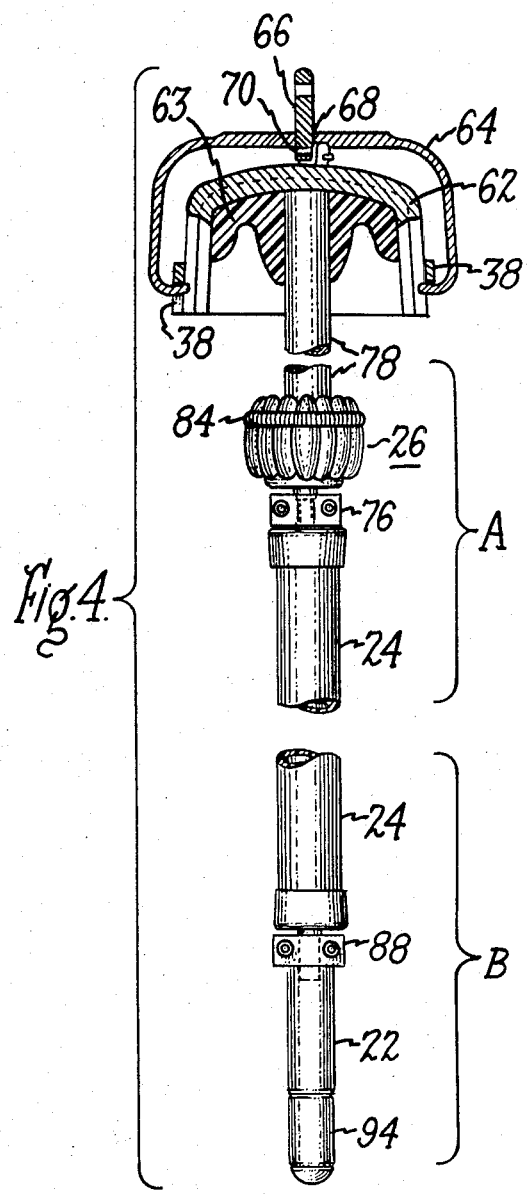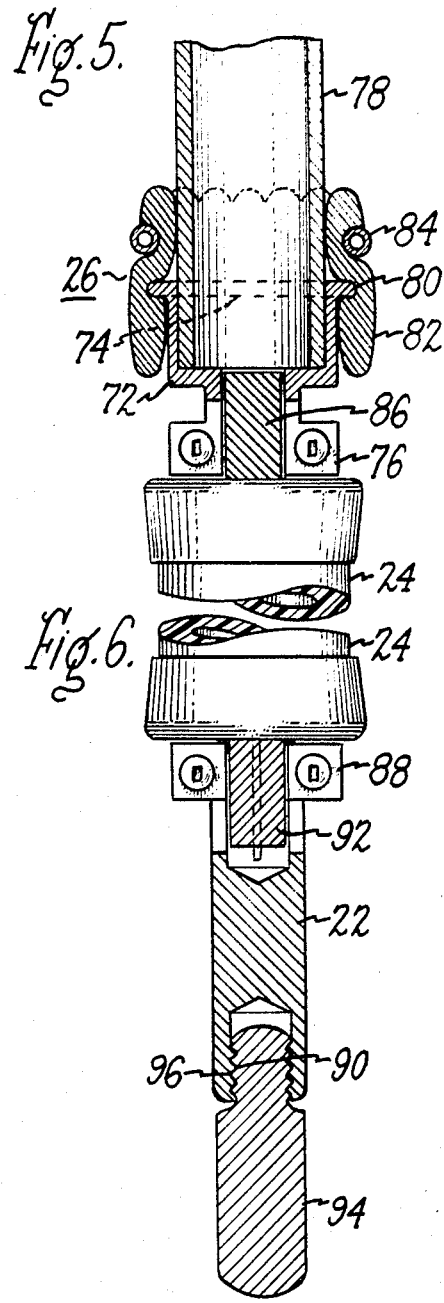

United States Patent Office 3,471,816
Patented Oct. 7, 1969

3,471,816
LOADBREAK FUSEHOLDER
Bertrand V. Giegerich, Pittsfield, Mass., assignor to General Electric Company, a corporation of New York
Filed Feb. 1, 1968, Ser. No. 702,244
Int. Cl. H01h 85/02, 85/46
U.S. Cl. 337—195               3 Claims

ABSTRACT OF THE DISCLOSURE

A loadbreak fuseholder for hermetically sealed high voltage devices such as transformers which fuseholder consists of a fuse retaining structure which is insertable into an insulated receptacle hermetically sealed within the transformer. The fuse retaining structure is an integrated load breaker and fuse combination comprising a loadbreak termination contact at a lower end, a conventional fuseholder cap at an upper end, and a current limiting fuse mounted between the two. A sealed gas pressure expansion chamber and an internal electrical termination contact are mounted within the lower end of the receptacle with the chamber in gas pressure communication with the contact and protruding through the insulation of the receptacle for proper heat transfer. The internal contact is connected to an external contact mounted on the lower end of the receptacle and is designed to engage the loadbreak termination contact of the inserted fuse retaining structure. An expandable contact member is mounted on the upper end of the fuse to electrically connect the fuse with a tubular contact mounted on the upper inner wall of the receptacle around the fuse and this tubular internal contact is, in turn, connected to an upper external contact. The cap seals off the inside of the receptacle and locks the inserted fuse retaining structure in proper operating position.

BACKGROUND OF THE INVENTION

This invention relates to fuseholders and, more specifically to improvements in holders for current limiting fuses used in connection with high voltage loadbreak terminations within hermetically sealed devices such as underground transformers.

In recent years, the subsurface electrical power distribution system has become increasingly important in both the residential and commercial areas. Due to the inherent characteristics of such underground installations, however, working access to system components, personnel safety, equipment protection, and maintenance expense present serious problems.

The heart of the subsurface distribution system is the underground hermetically sealed transformer. In protecting this device against secondary or service faults, secondary load breakers with internal weak fuses have been utilized as the obvious means for overload protection because this combination divorces all secondary considerations from the primary system. Such a secondary breaker may, however, drop power users on severely overloaded transformers or create fuse coordination problems with upstream electrical devices. As a result of this dilemma, utility men have long recognized the need for an effective and economical device for providing the function of a single primary fuse with a time-current characteristic low enough to respond to secondary faults, a fuse which will rapidly disconnect the transformer from the primary service in case of transformer failure, with means for permitting the safe and easy removal of this fuse and related components by a hot line tool without de-energizing the primary and, with means to ensure safe closing on a faulty transformer or a secondary fault.

The most common approach taken to meet the aforementioned needs includes the use of a current limiting primary fuse housed within a receptacle which is mounted on or in the transformer and is electrically connected thereto through a separate load breaker positioned within the transformer. This approach, while providing a rough solution to the needs of the system, has presented new problems.

The installation of a separate load breaker and fuse holder in a hermetically sealed transformer is relatively expensive and the internally mounted loadbreaker is not easily accessible. When the breaker is closed or opened on a fault, it causes dangerous arcing which, in turn, often results in damage requiring expensive maintenance. If an arc extinguishing gas is used in connection with the loadbreaker, the gas so provided destroys the hermetical seal of the transformer and contaminates the dielectric fluid therein. The necessary operating procedures promulgated to ensure that the fuse cannot be removed or replaced with a closed loadbreaker are unduly complicated and thereby present an element of danger to both personnel and equipment.

Accordingly, it is one object of this invention to provide an improved fuseholder for use in transformers or the like which fuseholder provides the integrated functions of both a fuse and a loadbreaker in a single, compact and inexpensive device.

It is another object of this invention to provide an improved fuseholder for use in transformers or the like which fuseholder is easy and economical to maintain.

It is a further object of this invention to provide an improved fuseholder for use in transformers or the like which fuseholder substantially eliminates the dangers presented by the arcing of a connecting loadbreaker when it is closed or opened on a fault.

It is still a further object of this invention to provide an improved fuseholder for use in hermetically sealed transformers or the like which fuseholder prevents the destruction of the hermetical seal by arc gas products.

SUMMARY OF INVENTION

In carrying out this invention in the preferred form, an improved fuseholder is provided having an insulated, elongated receptacle which is hermetically sealed within an electrical device. An integrated fuse and loadbreaker contact structure is provided for insertion into the receptacle. A first external contact is provided on the receptacle having an electrical connection with a first internal contact mounted within the receptacle and adapted to engage a loadbreaker contact provided on the integrated structure. Means are provided on the fuse of the integrated structure to electrically connect it with a second internal contact mounted within the receptacle and electrically connected to a seond external contact also provided on the receptacle. In another aspect of the invention, an arc extinguishing gas supplying means and a sealed gas pressure expansion chamber are provided within the fuseholder with the chamber adapted to receive and cool the arc gas.

BRIEF DESCRIPTION OF DRAWINGS

The specification concludes with claims which particularly point out and distinctly claim the invention which is sought to be protected and a preferred embodiment is disclosed in the following detailed description in connection with the accompanying drawings in which:

FIGURE 4 is a partial sectional elevation view of the integrated loadbreaker and fuse structure to be inserted into the receptacle as shown in FIGURE 1.

FIGURE 5 is a partial sectional elevation view of segment A of the integrated structure shown in FIGURE 4, and FIGURE 6 is a partial sectional elevation view of segment B of the integrated structure shown in FIGURE 4.

DESCRIPTION OF PREFERRED EMBODIMENT

Figure 1:
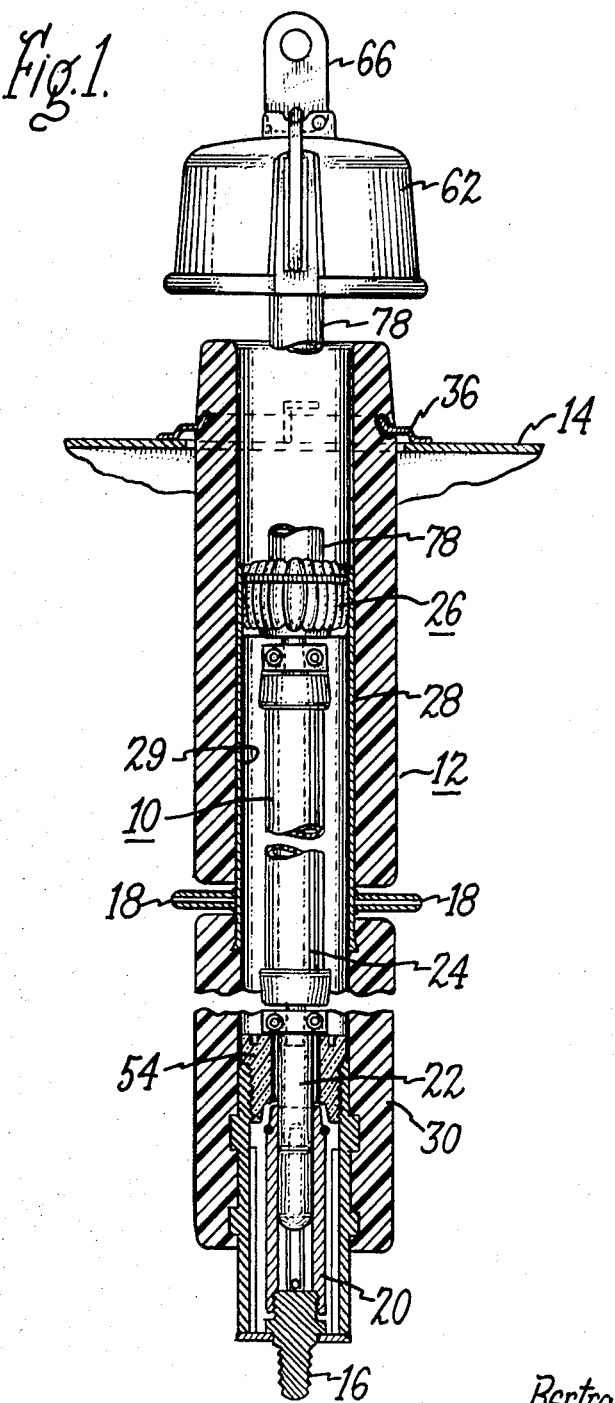
FIGURE 1 is an overall partial sectional elevation view showing the improved fuseholder as an integrated loadbreaker and fuse insert structure positioned within a receptacle adapted to receive and hold the structure.

Referring now to the drawings, in which like numerals are used to indicate like parts throughout the various views thereof, a preferred embodiment of this invention is shown in FIGURE 1 as a fuseholder comprising an integrated loadbreak contact and fuse insert structure 10 and a receptacle 12 for receiving and holding the structure 10.

The receptacle 12, which is generally of a hollow cylindrical configuration, is hermetically sealed within the housing 14 of an electrical device such as a transformer.

The receptacle 12 may be molded to a metal plate or wall member for hermetically sealing to wall 14 of the electrical device in the manner more fully described and claimed in application Ser. No. 470,068 filed July 7, 1965 for Plastic Bushing for Electrical Apparatus and Method of Making, in the names of F. S. Nichols, G. F. Lipsey and G. C. Nonken, and assigned to the same assignee as this application. An external contact 16 is mounted on the lower end of receptacle 12 and external contacts 18 are brought out through the sides of the receptacle 12. The contacts 16 and 18 are used to connect the fuse holder through a hermetically sealed connection with the circuitry within the housing 14. An internal contact 20 is fitted within the lower end of the receptacle 12 and is threadedly engaged with the inner portion of external contact 16. The internal contact 20 is tubular in shape and is formed to receive a male loadbreak contact 22 which is attached to the lower end of the structure 10 and is electrically connected to one end of a fuse 24. A contact and clamp assembly 26 is electrically connected and structurally secured to the other end of the fuse 24 and serves to connect that end of the fuse with an upper internal contact 28. The external contacts 18 are preferably brazed to the internal contact 28 which thereby provides a complete fuseholder circuit from the external contact 16, through the insert structure 10, to the external contacts 18. An insulating liner 29 is provided fitting tightly against contact 28 to prevent any arc over from the bottom of fuse 10 and the contact 28, as shown in FIGURES 1 and 2.

Figure 2:
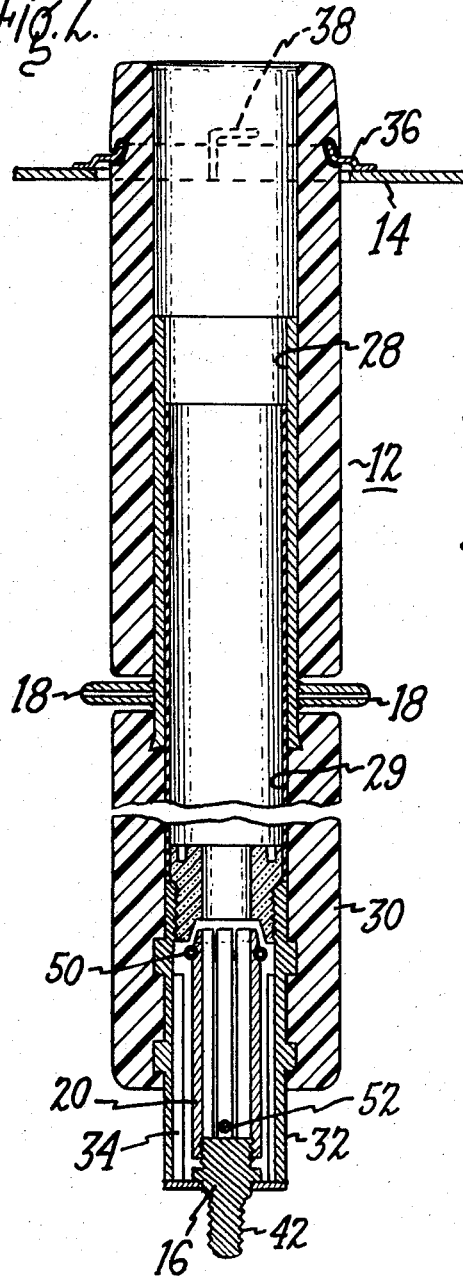
FIGURE 2 is a sectional elevation view of the receptacle of the improved fuseholder shown in FIGURE 1.

FIGURE 2 shows the receptacle 12 which includes a cylindrical casing 30 of an insulating material such as epoxy and a sealed gas pressure expansion chamber 32 which is fitted within the casing 30 to form the lower portion of the overall receptacle 12. The chamber 32 consists of a highly heat conductive material and is mounted hermetically within casing 30 with the lower end of the chamber extending below the insulating casing 30 to provide proper heat transfer between gases within the chamber 32 and a fluid (not shown) surrounding the receptacle 12. Cooling vanes 34 may be installed within the chamber 32 to assist in the heat transfer process.

The upper end of the receptacle 12 is open to receive the insert structure 10 and is provided with a hermetical sealing flange 36 which is secured directly to the transformer housing 14, whereby the receptacle is mounted substantially within the hermetically sealed transformer. L-shaped lugs 38 are secured, preferably by welding, to housing 14 for receiving a conventional latching means which is an integral part of the insert structure 10 and is fully described later in this disclosure.

Figure 3:
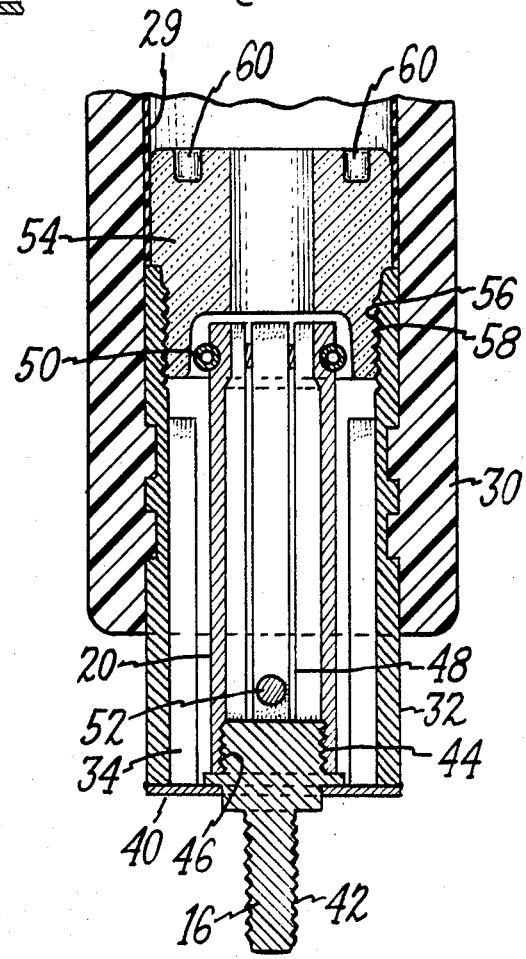
FIGURE 3 is an enlarged sectional elevation view of the lower portion of the receptacle shown in FIGURE 1 and FIGURE 2.

Referring now to FIGURE 3, the external contact 16 is hermetically mounted through the bottom wall 40 of chamber 32 and is machined with threads 42 exposed outside the chamber and threads 44 disposed within the chamber. The threads 42 are used to connect the fuseholder with the transformer circuit while threads 44 engage threads 46 formed on the internal contact 20 and thereby mount contact 20 within the chamber 32. The internal contact 20 is tubular in shape and formed with a plurality of longitudinal slots or gas ports 48 extending through the unthreaded portion of the contact. A circular spring 50 is fitted around the upper end of the contact 20 in order to preserve the tubular shape of the contact and to ensure a proper electrical connection when the male load break contact 22 of the structure 10 is inserted within the contact 20. A pin 52 is mounted within the lower end of the contact 20 transverse to the tubular axis so that the contact may be easily externally removed from the receptacle 12 by merely securing a torque-applying tool to the pin and turning it so as to disengage threads 44 and 46. A generally cylindrical member 54, which assists in aligning and stablizing contact 22 of structure 10 as it is inserted within contact 20, is fitted within the casing 30 and is secured to chamber 32 by the engagement of threads 56 of the chamber and threads 58 of member 54. Holes 60 are formed in the upper surface of member 54 for receiving a teorque-applying tool to disengage threads 56 and 58 and thereby provide for the easy external removal of member 54.

As shown in FIGURE 4, the integrated loadbreak contact and fuse insert structure 10 consists of three principal parts; the male loadbreak contact 22, the fuse 24 and a cap 62. The aforementioned conventional latching means of the structure 10 is mounted on the cap 62 and includes a rod or bail 64, which is bent to resemble a pair of tongs, the ends of which, are engaged by lugs 38 secured to housing 14. The rod 64 is hingedly mounted through a lever 66 at aperture 68 and the lever is, in turn, pivotedly mounted on the cap 62 by pin 70. To latch cap 62 to receptacle 12, the ends of rod 64 engage lugs 38 with the lever 66 in the upright position. When the lever is then pivoted so as to move the rod 64 in the upward direction, the cap 62 and receptacle 10 are forced into pressure contact. Cap 62 is provided with resilient insulation 63 as shown in FIGURE 4. As will be understood, insulation 63 fits over the open end of receptacle 12, and when the cap is latched to the electrical device housing 14, the insulation seals the open end of the recptacle 12 providing a waterproof seal for the receptacle.

Referring to FIGURE 5, the contact and clamp assembly 26 is shown to include a member 72 formed with an upper cup end 74 and a lower clamp end 76. The cup end 74 receives and holds the lower end of a tubular stem 78, formed on and projecting down from the inside of the cap 62. An outer flange 80 is machined around the lip of the cup end 74 to accommodate the attachment of an expandable segmented contact 82 which is secured to the overall structure 10 by a spring 84. The clamp end 76 is used to grip a contact 86 on the upper end of the fuse 24 and when the complete assembly 26 is properly inserted into the receptacle 12, contact 82 engages the internal contact 28 thereby electrically connecting it with the fuse 24 through the assembly 26.

The load break contact portion of the structure 10 is shown in FIGURE 6 and includes the contact 22 which is formed with a clamp 88 at the upper end and a threaded bore 90 in the lower end. Clamp 88 is used to grip a contact 92 on the lower end of the fuse 24 and an arc follower member 94 of a solid gas generating material, is secured to the contact 22 by the engagement of threads 96 on member 94 within the threaded bore 90. When this portion of structure 10 is properly positioned within receptacle 12, the contact 22 engages the internal receptacle contact 20 and electrically connects it with the lower end of fuse 24.

In operation, the integrated load breaker and fuse structure 10 shown in FIGURE 4 is forced into the receptacle 12, shown in FIGURE 2, and is properly latched to the casing 30 a previously described. If during this procedure, contacts 20 and 22 close on a fault, the resulting arc will act upon arc follower member 94 to generate arc extinguishing gases which limit the arc to acceptable, safe values. The resulting hot expanding gases then vent through the slots or gas ports 48 of contact 20 and flow into gas pressure expansion chamber 32 wherein the shock energy and extreme heat of the gases are safely dissipated. Since the gases are not vented into the transformer, as they are in existing transformer termination device, the integrity of the hermetical seal of the transformer 14 is preserved and a dielectric liquid in the transformer is not contaminated by the arc gas products. Since the receptacle 12 is completely sealed with no gas ports or valves connecting the inside of the transformer with the inside of the receptacle, atmospheric oxygen and moisture are excluded from the inside of the transformer even under conditions where the transformer pressure is below atmosphere. Due to the extension of pressure chamber 32 beyond the insulating casing 30, an effective heat flow is provided from the gases within the chamber, to the surrounding outer fluid which may be the dielectric liquid itself.

This combination of fuse and loadbreak termination within a single integrated device is less expensive than existing units to construct and install and provides the capability of safely closing in on severe faults which, at present, may range to 30,000 amperes at 8,700 volts. Maintenance, which has always been a significant problem with existing underground units is simplified and less costly. By unlatching cap 62, the fuse 24 and loadbreak contact 22 are easily accessible and simultaneously removable.

Procedures for removing the fuse 24 are greatly simplified because it is not necessary to interrupt the primary or to ensure that an auxiliary separate loadbreaker is properly open as the fuse cannot be removed or replaced unless the loadbreak contacts 20 and 22 are disengaged. To further disassemble the fuseholder, a torque-applying tool is inserted into the casing to disengage and remove member 54 and, with member 54 removed, maintenance personnel have direct access to the loadbreak contact 20 which is easily disengaged from contact 16 by employment of the appropriate hot line tools.

It should be understood that while there has been shown and described a particular embodiment of the invention, it would be obvious to those skilled in the art that various changes and modifications may be made without departing from the spirit and scope of the invention as set forth in the claims appended hereto.

What is claimed as new and which it is desired to secure by Letters Patent of the United States is:

1. A fuseholder including a fuse receptacle mounted substantially within a hermetically sealed electrical device: the improvement comprising a hermetic seal about a first end of the receptacle, a first external contact mounted on said first end, a receptacle sealing member, an open second end of the receptacle with means for attaching said sealing member, means provided about said second end for hermetically sealing the receptacle within an electrical device, a first internal electrical contact mounted within said first end of the receptacle and connected to said first external electrical contact, a gas pressure expansion chamber adjacent to and in gas pressure communication relationship with said first internal contact, a second internal electrical contact mounted within said second end of the receptacle, a second external electrical contact connected to said second internal electrical contact and projecting through the wall of the receptacle, an integrated fuse and load breaker contact structure for insertion into the receptacle, said structure comprising a loadbreak termination contact at a first end and said receptacle sealing member at a second end, means for mounting a current limiting fuse between said loadbreak termination contact and said outer sealing member, said outer sealing member provided with means for locking said integrated fuse and loadbreak contact structure within the casing, said loadbreak contact so formed as to engage said first internal electrical contact, said engagement electrically connecting said internal contact with a first end of the fuse, and means at the second end of said structure for electrically connecting a second end of the fuse with said second internal contact, and a substantial portion of the receptacle comprising an insulating casing, with said first and second external contacts and a portion of said pressure chamber protruding therethrough.

2. The fuseholder as set forth in claim 1 with the additional improvement of cooling vanes attached to said pressure expansion chamber, and means disposed within the receptacle for supplying an arc extinguishing gas.

3. A fuseholder as set forth in claim 1 in which said first internal contact is removably mounted within said receptacle, said first internal contact having means for removal without disturbing said hermetic seal.

References Cited

UNITED STATES PATENTS

| 3,236,974 | 2/1966 | Louden et al. | 337—195 |
| 3,268,693 | 8/1966 | Linton | 337—195 |
| 3,009,037 | 11/1961 | Jones et al. | 337—7 |

BERNARD A. GILHEANY, Primary Examiner

H. B. GILSON, Assistant Examiner

U.S. Cl. X.R.
337—234, 251